(12) United States Patent
Maxwell

(10) Patent No.: US 7,770,962 B1
(45) Date of Patent: Aug. 10, 2010

(54) DYNAMIC AUTOMOBILE WING

(76) Inventor: John B. Maxwell, 5439 Old Citronelle Hwy., Eight Mile, AL (US) 36613

( * ) Notice: Subject to any disclaimer, the term of this patent is extended or adjusted under 35 U.S.C. 154(b) by 0 days.

(21) Appl. No.: 12/386,010

(22) Filed: Apr. 13, 2009

(51) Int. Cl.
*B62D 35/00* (2006.01)
(52) U.S. Cl. .................................. 296/180.5
(58) Field of Classification Search ............ 296/180.1, 296/180.5
See application file for complete search history.

(56) References Cited

U.S. PATENT DOCUMENTS

| | | | |
|---|---|---|---|
| 4,629,240 A | 12/1986 | Dornier | |
| 5,061,007 A | 10/1991 | Simpson | |
| 5,833,514 A | 11/1998 | Eaton | |
| 6,520,564 B1* | 2/2003 | Liang | 296/180.5 |
| 6,540,282 B2 | 4/2003 | Pettey | |
| 6,814,395 B1 | 11/2004 | Lin | |
| 7,213,870 B1 | 5/2007 | Williams | |
| 2002/0067049 A1 | 6/2002 | Pettey | |
| 2002/0167196 A1* | 11/2002 | Huang | 296/180.5 |
| 2007/0145776 A1 | 6/2007 | Grave et al. | |

* cited by examiner

*Primary Examiner*—Dennis H Pedder
(74) *Attorney, Agent, or Firm*—George L. Williamson

(57) ABSTRACT

Apparatus and method for an airfoil being disposed on the rear of an automobile or like vehicle. The angle of the airfoil is controlled by a bob weight connected to the airfoil through a series of linkages so that when the vehicle accelerates or de-accelerates, the angle of the airfoil is adjusted. The linkage between the airfoil and the bob weight controls the angle of attack of the airfoil so as to optimize vehicle down force on the tires so as to optimize performance.

12 Claims, 3 Drawing Sheets

DYNAMIC AUTOMOBILE WING

BACKGROUND OF THE INVENTION

1. Field of the Invention

The present invention relates generally to automobiles and, more particularly, is concerned with an airfoil disposed on an automobile.

2. Description of the Prior Art

Airfoils disposed on automobiles have been described in the prior art, however, none of the prior art devices disclose the unique features of the present invention.

In U.S. Pat. No. 6,540,282 dated Apr. 1, 2003 Pettey disclosed an adjustable automotive airfoil. In U.S. Pat. No. 5,833,514 dated Nov. 10, 1998 Eaton disclosed a reactionary force utilization. In U.S. Patent Application Publication 2007/0145766 dated Jun. 28, 2007 Grave, et al., disclosed a motor vehicle with at least one aerodynamic spoiler. In U.S. Pat. No. 7,213,870 dated May 8, 2007, Williams disclosed an adjustable spoiler. In U.S. Pat. No. 6,814,395 dated Nov. 9, 2004, Lin disclosed an electronic spoiler having adjustable heights. In U.S. Patent Application Publication No. 2002/0067049 dated Jun. 6, 2002, Pettey disclosed an adjustable automotive airfoil. In U.S. Pat. No. 5,061,007 dated Oct. 29, 1991, Simpson disclosed a torsionally adjustable vehicle wing for uneven application of negative lift to the wheels. In U.S. Pat. No. 4,629,240 dated Dec. 16, 1986 Dornier disclosed a vehicle stabilizing means.

While these automobile wings may be suitable for the purposes for which they were designed, they would not be as suitable for the purposes of the present invention as hereinafter described.

SUMMARY OF THE PRESENT INVENTION

The present invention discloses an airfoil being disposed on the rear of an automobile or like vehicle. The angle of the airfoil is controlled by a bob weight connected to the airfoil through a series of linkages so that when the vehicle accelerates or de-accelerates, the angle of the airfoil is adjusted. The linkage between the airfoil and the bob weight controls the angle of attack of the wing so as to optimize vehicle down force on the tires so as to optimize performance.

An object of the present invention is to provide a wing disposed on a vehicle. A further object of the present invention is to improve the handling characteristics of the vehicle. A further object of the present invention is to provide an airfoil mechanism which can be easily used by the operator of the vehicle. A further object of the present invention is to provide an airfoil on a vehicle which can be easily and relatively inexpensively manufactured.

The foregoing and other objects and advantages will appear from the description to follow. In the description reference is made to the accompanying drawings, which form a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWINGS

In order that the invention may be more fully understood, it will now be described, by way of example, with reference to the accompanying drawings in which.

LIST OF REFERENCE NUMERALS

Figure 1:
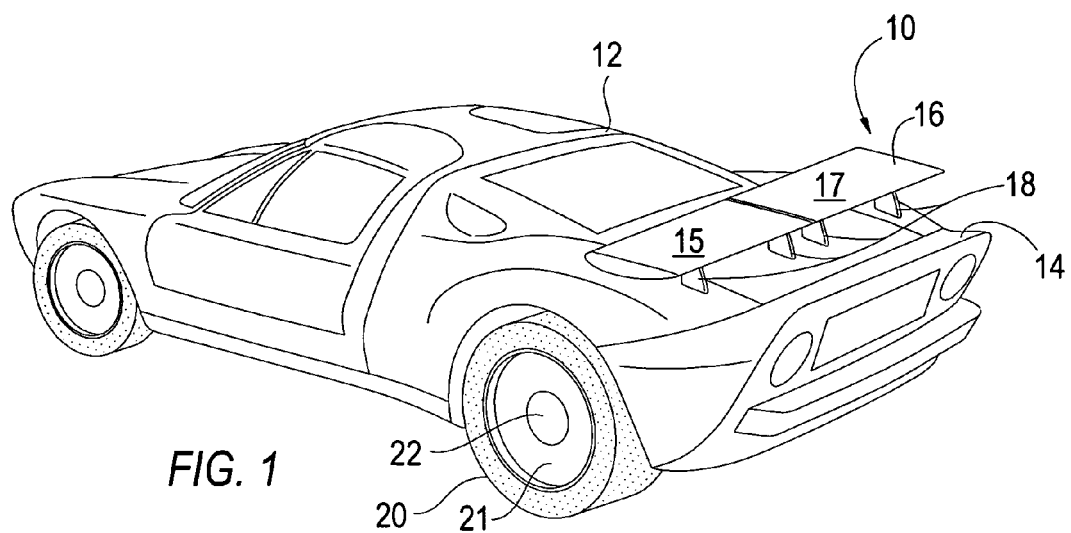
FIG. 1 is a perspective view of the present invention in operative connection.

With regard to reference numerals used, the following numbering is used throughout the drawings.

10 present invention
12 automobile/vehicle
14 rear end
15 airfoil—left portion
16 airfoil
17 airfoil—right portion
18 wing mount
20 tire on wheel
21 wheel
22 axle
24 pivot shaft
26 pivot arm
28 enclosure
30 pivot shaft support
32 intermediate linkage upper pivot
34 intermediate linkage lower pivot
36 intermediate linkage
38 balance lever
40 fulcrum point
42 bob weight
44 acceleration balance spring adjustment anchor
46 braking balance spring adjustment anchor
48 acceleration balance spring adjustment
50 braking balance spring adjustment
52 airfoil rotation arrow
54 braking force arrow
56 acceleration force arrow
58 tire friction circle
60 acceleration force vector
62 braking force vector
64 lateral force vector
66 resulting total force vector
68 tire friction cone
70 tire friction circle under maximum down force
72 vertical down force vector
74 tire friction circle under static down force
76 adjustment apertures
78 proximate frame member
80 arrow showing forward direction

DETAILED DESCRIPTION OF THE PREFERRED EMBODIMENT

The following discussion describes in detail at least one embodiment of the present invention. This discussion should not be construed, however, as limiting the present invention to the particular embodiments described herein since practitioners skilled in the art will recognize numerous other embodiments as well. For a definition of the complete scope of the invention the reader is directed to the appended claims. FIGS. 1 through 5 illustrate the present invention wherein an airfoil for attachment to a vehicle disclosed.

By way of general background explanation, the handling of a perfectly balanced vehicle is characterized by turns with slip angles of the front and rear tires being equal. In the case of an imbalance of understeer, the slip angle of the front tires is greater than the rear, an imbalance of oversteer is the opposite condition. This equality of slip angles provides a more natural relationship between steering wheel input and vehicle rotation such that the limit of tire adhesion can be more easily detected. Front and rear slip angles must not only be equal they must be coincident with the required front and rear lateral accelerations. For steady-state conditions, front to rear lateral accelerations are in equal ratio to the static front to rear weight distribution. For a given pneumatic tire and inflation pressure, an operating point of a specific slip angle and specific lateral acceleration is unique to a specific normal load on the wheel. Therefore, managing the normal loads on wheels is critical in managing vehicle balance. In low speed steady-state turns (constant vehicle speed), normal loads on wheels can be controlled by chassis setup alone, without the need for wing control. However, as speed increases, front to rear normal wheel loading from body configuration aerodynamic down forces can change disproportionally to the low speed steady-state condition, changing the ratio of available lateral force and upsetting the balance. Also, the resulting aerodynamic drag from increased speed must be overcome by increased longitudinal force from the rear driven tires which decreases the available lateral force from the rear driven tires and impacts vehicle balance. In addition, during braking and acceleration, the distribution of normal loads front to rear are drastically changed due to rear-to-front and front-to rear weight shift, resulting in imbalance. For conditions other than a low speed steady-state turn, vehicle chassis setup can only accommodate balance at one operating point in the changing environment of aerodynamic forces, braking forces and acceleration forces. Balance in all operating conditions can only be maintained by controlling normal loads on the rear driven wheels over the entire operating environment. The intent of this invention is to provide that control with variable down force provided by passive dynamic control of the aforementioned wing. In addition to low speed steady-state, there are three basic operating conditions for dynamic control which can occur over the complete spectrum of vehicle operation, either, in a turn or when the vehicle is moving forward: 1) High Speed Steady-State; 2) Braking; and, 3) Acceleration.

The present invention is a system utilizing a wing to provide variable down force to the rear wheels for rear wheel drive vehicles. The wing comprises an adjustable airfoil pivoting on a shaft which is supported by upright structures attached to the body of the vehicle directly above the rear wheels. Down force on the rear wheels is variable by changing the wing angle of attack, which is determined by rotating the wing about its shaft which is located at the neutral axis of the airfoil. An airfoil of proper size for the intended vehicle is mounted to a pivot shaft at the airfoil neutral axis or point. This wing produces a down force as opposed to the associated lift with aircraft wings. Down force is transmitted from the airfoil through the pivot shaft to an upright structure mounted directly above each of the rear wheels, on to the automobile to which it is mounted and ultimately through the automobile chassis to the drive wheels. A balance lever within the wing mount upright comprises a pivot on which the lever rotates, a bob weight for reaction to accelerations and balancing springs which balance the reactive forces of the bob weight. Rotation of the balance lever is in a vertical plane parallel to the longitudinal axis of the vehicle. At rest or during constant speeds, the lever is held at a fixed position based on the preload of the balance springs. Connection is made between the balance lever and the airfoil or wing by an intermediate link and a pivot shaft arm. Linkage arrangement is such that bob weight motion, either fore or aft, will result in a wing rotation which drops the front of the wing and raises the rear. The result is an increase in wing angle of attack and an increase in down force. A static angle of attack for the wing is set by adjusting the intermediate link. Both the vehicle drag and down force from the wing will increase to the square of increase in speed. Properly adjusted, the down force from the wing on to the drive wheels will allow the tires to produce a total vector force which is equal to the vector sum of the driving force to overcome drag and the maximum low speed lateral force. Therefore, the same balance is maintained at all speeds, satisfying condition 1. Acceleration and braking balance springs are adjusted to provide additional increase in wing angle of attack and additional down force which provides additional increase in the total vector force from the tire and maintains balance during acceleration and braking, satisfying conditions 2 and 3. Because the wing pivots at the neutral point, there is no moment induced by the wing as it produces down force and the balance of the springs and bob weight is unaffected.

Turning to FIG. 1, therein is shown the present invention 10 being an airfoil or wing 16 disposed on the rear end 14 of a vehicle 12 wherein the wing is supported by multiple wing mounts 18 and thereby connected to the vehicle, wherein the vehicle has a rear end 14. Also shown are the tires 20 on the wheels 21 along with the axle 22 of vehicle 12. The airfoil 16 may have a left portion 15 and a right portion 17 which operate independently of each other.

Figure 2:
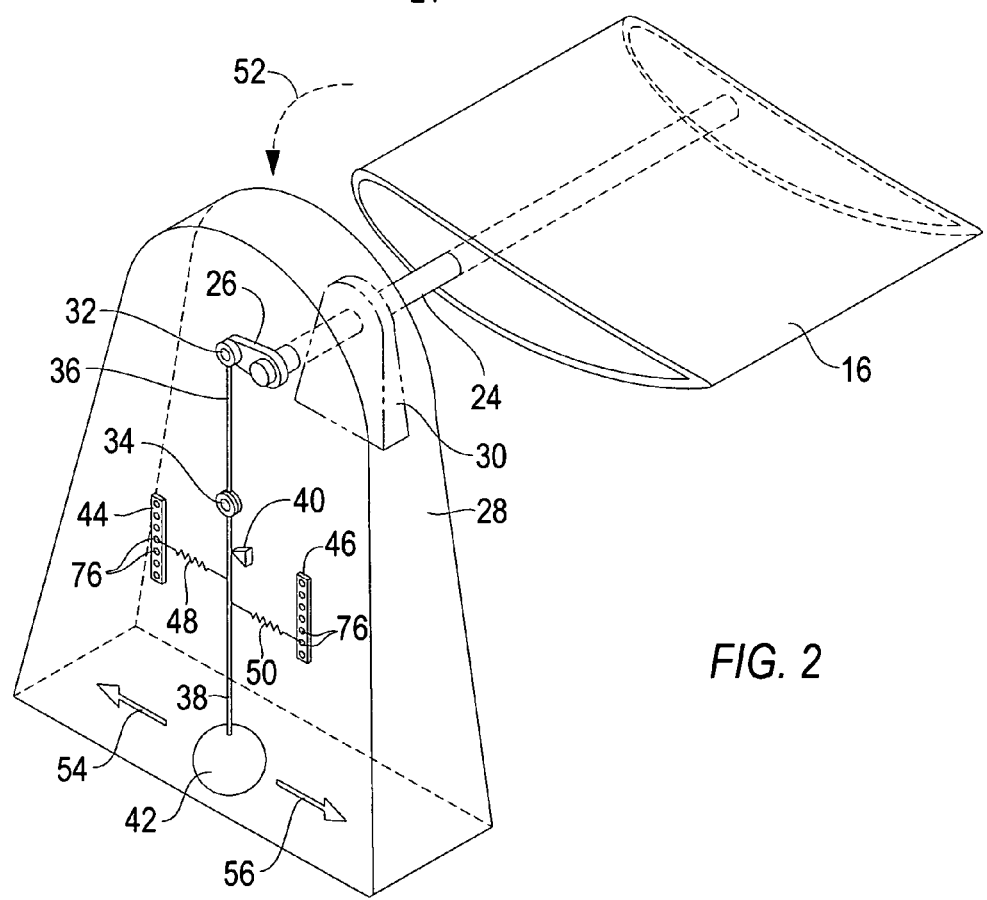
FIG. 2 is a perspective view of portions of the present invention.

Turning to FIG. 2, therein is shown the airfoil or wing 16 mounted on a rotatable pivot shaft 24 having a pivot arm 26 on its end, portions of which are mounted in an enclosure 28. Also shown is pivot shaft support 30 along with an intermediate linkage upper pivot 32 and an intermediate linkage lower pivot 34 along with intermediate linkage 36 having a lower balance lever 38 connected thereto and pivoting about fulcrum point 40 which is securely disposed on an appropriate proximate frame member of the vehicle. Also shown is bob weight 42 along with a first front frame member anchor 44 and a second rear frame member anchor 46 having an acceleration adjustment spring 48 connecting the balance lever 38 to the front frame member anchor and a braking adjustment spring 50 connecting the balance lever to the rear frame member anchor. Also shown is arrow 52 indicating rotation of the wing 16 along with arrow 54 and arrow 56 showing the front and rear movement, respectively, of bob weight 42. Frame members 44, 46 each have multiple adjustment apertures 76 therein for adjusting the tension and thus the moment applied to balance lever 38 by springs 48, 50.

Figure 3:
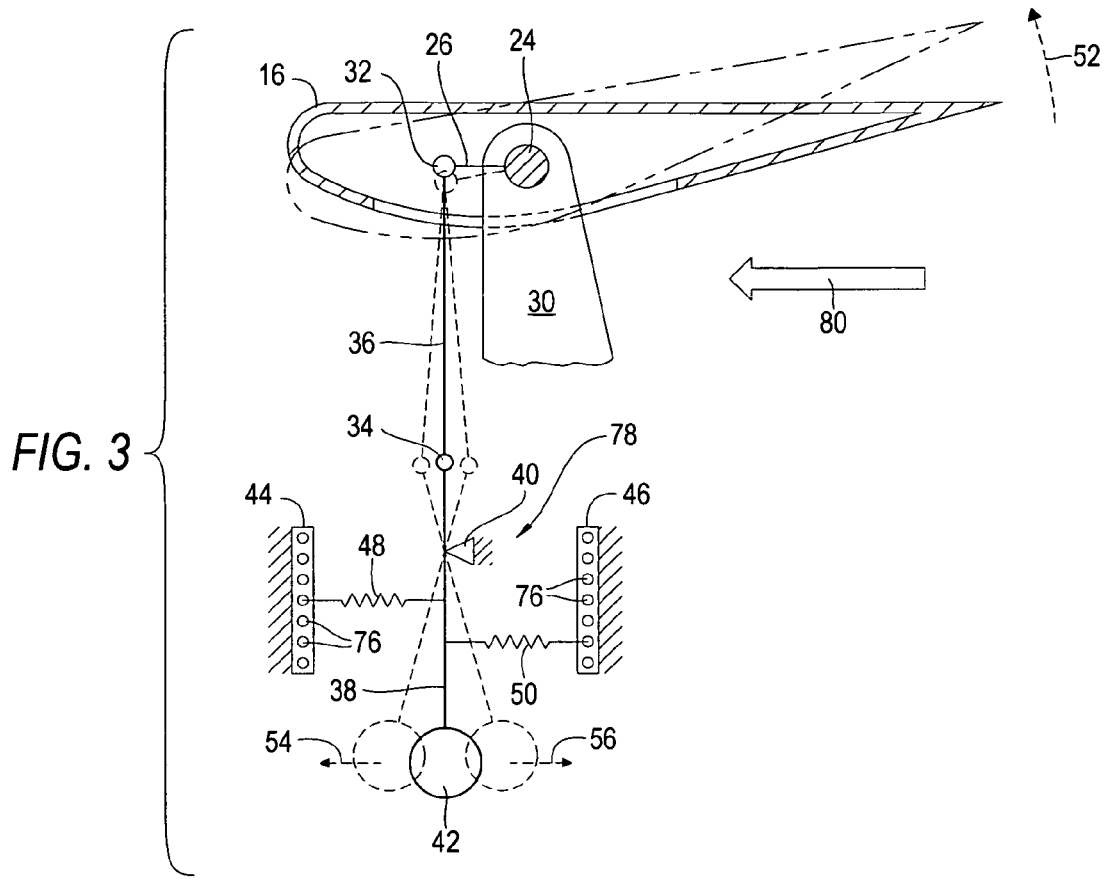
FIG. 3 is a perspective view of portions of the present invention.

Turning to FIG. 3, shown therein is the airfoil or wing 16 mounted on a pivot shaft 24 having a pivot arm 26 on its end, or otherwise connected thereto, portions of which may be mounted in an enclosure 28 (not shown, see FIG. 2). Also shown is pivot shaft support 30 along with an intermediate linkage upper pivot 32 and a intermediate linkage lower pivot 34 along with intermediate linkage 36 having a lower balance lever 38 connected thereto and pivoting about fulcrum point 40 which is securely disposed on an appropriate proximate frame member 78 of the vehicle. Also shown is bob weight 42 along with a first front frame member anchor 44 and a rear frame member anchor 46 having an acceleration adjustment spring 48 connecting the balance lever 38 to the front auto frame member and a braking adjustment spring 50 connecting the balance lever to the rear frame member. Also shown is arrow 52 indicating rotation of the airfoil 16 along with arrow 54 and arrow 56 showing the front and rear movement, respectively, of bob weight 42. Frame members 44, 46 each have multiple adjustment apertures 76 therein for adjusting the tension on springs 48, 50 by placing one end of spring 48, 50 in alternate apertures 76. Arrow 80 shows the forward direction.

Figure 4:
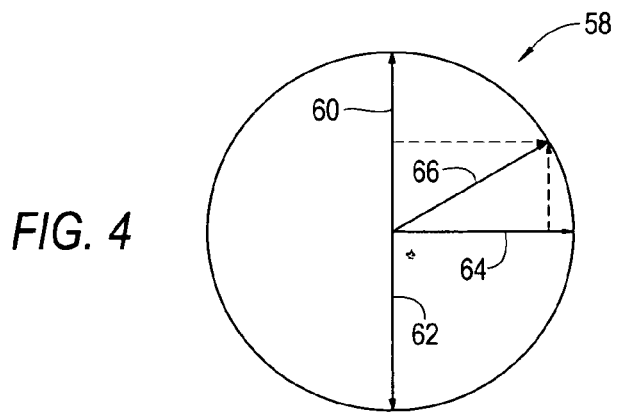
FIG. 4 is a diagram of a tire friction circle.

Turning to FIG. 4, therein is shown an exemplary tire circle 58 showing an acceleration force vector 60, braking force vector 62 and lateral force vector 64 along with the arrow indicating a resulting total vector force 66 which would occur with the exemplary illustrated movement of the automobile.

Figure 5:
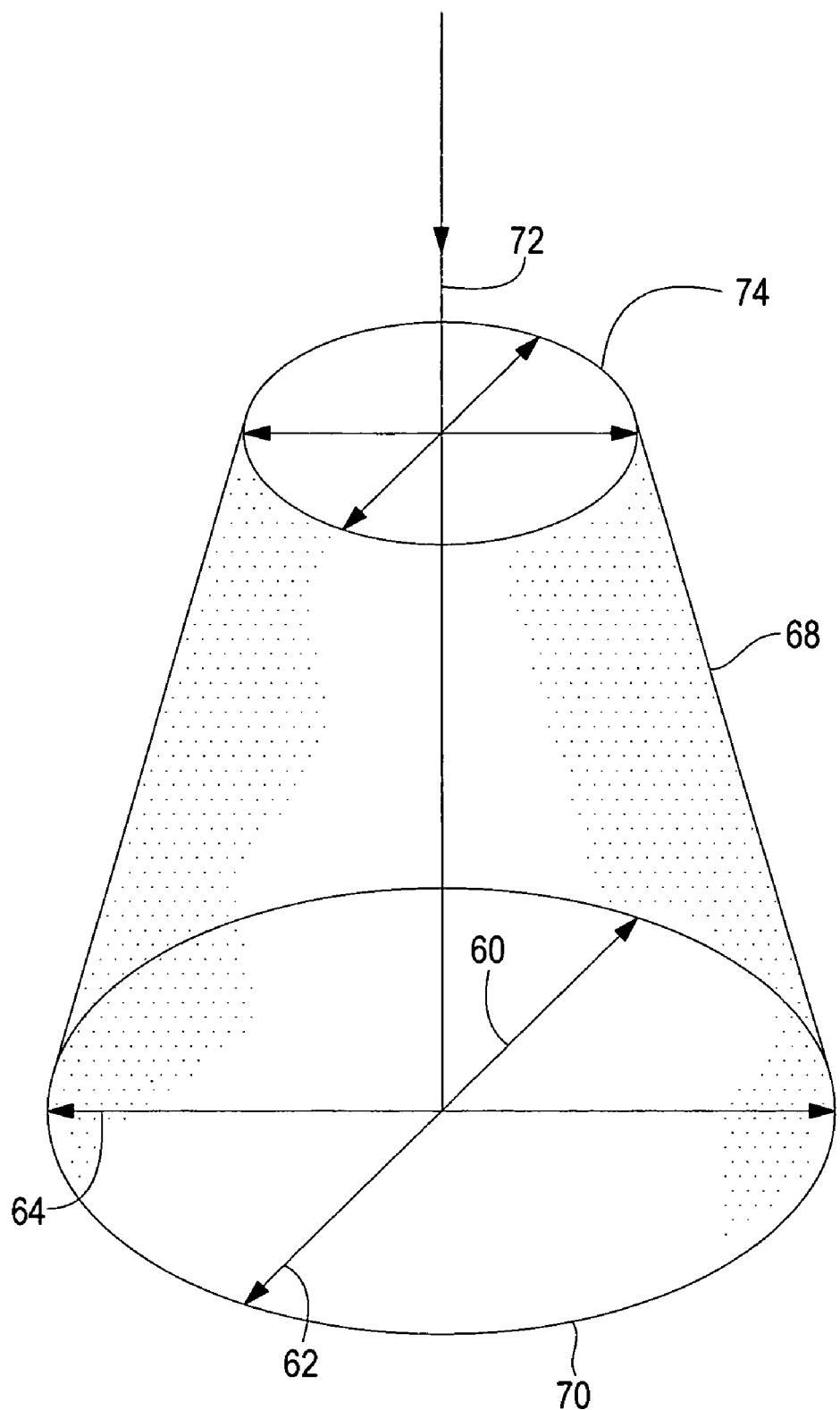
FIG. 5 is a diagram of a tire friction cone.

Turning to FIG. 5, therein is shown an exemplary tire friction cone 68 along with the acceleration force vector 60, braking force vector 62, lateral force vector 64 and a maximum down force tire friction circle 70. Also shown is the vertical down force vector 72 along with a static down force tire friction circle 74.

Vehicle chassis setup is aimed at establishing vehicle balance at the low speed steady-state condition. At higher speeds and non-steady-state conditions, the wing angle of attack is altered by movement of the bob weight as necessary to change the normal load on the rear wheels and maintain the established low speed steady-state balance. Vehicle balance is then achieved under all steady-state conditions. Balance for transitional turn conditions (into and out of turns) would require shock absorber calibration to achieve balance and that calibration would be good for all speeds.

High Speed Steady-State: During high speed steady-state conditions, aerodynamic down force can change the ratio of down force front to rear due to aerodynamics of the vehicle. An improper change in the ratio of front to rear down force can upset the balance established in the chassis setup. In addition, longitudinal forces on the driven tires will be produced as the reactive forces to vehicle aerodynamic drag. If the down force on the rear wheels stays constant, the increase in longitudinal force at the rear wheels reduces the available lateral force and balance is upset. This is a result of the tire friction circle characteristic, which is depicted in FIG. 4. Therefore, the wing angle of attack must be adjusted to compensate for the aerodynamic down forces as well as provide additional down force on the rear driven wheels to create the additional tractive effort needed to overcome the increase in longitudinal forces on the driven wheels.

Braking: During braking, weight is transferred from the rear wheels to the front wheels and the front to rear weight distribution is altered from the steady-state condition. Since the normal loads on the wheels are altered, the available lateral force will also be altered and the low speed steady-state vehicle balance will be upset. In order to maintain the low speed steady-state balance, consideration must be given to the distribution of longitudinal braking forces front-to-rear, along with the tire friction circle characteristics, to determine the change in rear down force from the wing. Wing down force may need to increase or decrease in order to provide the same low speed steady-state distribution of available lateral forces from the front and rear tires.

Acceleration: During acceleration, weight is transferred from the front wheels to the rear wheels and front to rear weight distribution is altered from the steady-state condition. Like braking, the normal loads on the wheels are altered, the available lateral force is altered and the low speed steady-stated vehicle balance will be upset. In order to maintain the low speed steady-state balance, consideration must be given to the distribution of longitudinal acceleration forces (rear only), along with the tire friction circle characteristics, to determine the change in rear down force from the wing. Wing down force may need to increase or decrease in order to provide the same low speed steady-state distribution of available lateral forces from the front and rear tires.

Turn Transitions: Vehicle balance during transition into and out of turns must be accomplished with shock absorber tuning as part of chassis setup. When shock absorbers are properly tuned for low speed steady-state turns, the effects of the wing, as previously described, will translate into transition balance during high speed steady-state, braking and acceleration.

Results: When the above conditions are met, high speed turns, braking turns and acceleration turns will exhibit the same balance as in low speed steady-state turns. Therefore, low speed steady-state balance can be achieved with chassis set up and the same balance will be carried over to all other conditions.

Configurations Other Than Rear Wheel Drive The concept described above can be extended to cover front wheel drive and all wheel drive vehicles by placing the wing at a different position on the vehicle and adjusting it (i.e., changing the control algorithm) to be specific to the vehicle.

I claim:

1. An apparatus for controlling the down force on the drive wheels on the rear end of a vehicle, comprising:
    a) an airfoil being disposed on the rear end of the vehicle;
    b) a rotatable pivot shaft disposed on said airfoil mounted thereon;
    c) an intermediate linkage having first and second ends, said first end of said intermediate linkage adapted for pivotal connection to said rotatable pivot shaft, wherein said intermediate linkage is downwardly disposed;
    d) a balance lever having first and second ends, said first end of said balance lever adapted for pivotal connection to said second end of said intermediate linkage, wherein said balance lever is downwardly disposed;
    e) a bob weight being suspended from said second end of said balance lever, wherein said bob weight moves rearward when the vehicle accelerates, wherein said bob weight moves forward when the vehicle deaccelerates; and,
    f) a fulcrum disposed between said first and second ends of said balance lever, wherein said fulcrum contacts said balance lever when the vehicle accelerates so that said airfoil rotates so as to increase down force on the rear of the vehicle.

2. The apparatus of claim 1, further comprising a first adjustable spring connected to said balance lever to permit an acceleration moment on the balance lever to be adjusted.

3. The apparatus of claim 1, further comprising a second adjustable spring connected to said balance lever to permit a de-acceleration moment to the balance lever to be adjusted.

4. The apparatus of claim 1, wherein said airfoil is downwardly disposed so that it produces a down force on the rear of the vehicle.

5. The apparatus of claim 4, further comprising a plurality of wing mounts for mounting said airfoil on the vehicle.

6. The apparatus of claim 5, wherein said airfoil has a first, left portion and a second, right portion.

7. A method for controlling the down force on the drive wheels on the rear end of a vehicle, comprising the steps of:
    a) providing an airfoil on the rear end of the vehicle;
    b) providing a rotatable pivot shaft on the airfoil;
    c) providing a downwardly disposed intermediate linkage having first and second ends, the first end of the intermediate linkage adapted for pivotal connection to the rotatable pivot shaft;

d) providing a downwardly disposed balance lever having first and second ends, the first end of the balance lever adapted for pivotal connection to the second end of the intermediate linkage;
e) suspending a bob weight from the second end of the balance lever so that the bob weight moves rearward when the vehicle accelerates and the bob weight moves forward when the vehicle de-accelerates; and,
f) providing a fulcrum between the first and second ends of the balance lever, wherein the fulcrum contacts the balance lever when the vehicle accelerates so that the airfoil rotates so as to increase down force on the rear of the vehicle.

8. The method of claim 7, further comprising the step of providing a first adjustable spring connected to the balance lever to permit an acceleration moment on the balance lever to be adjusted.

9. The apparatus of claim 7, further comprising the step of providing a second adjustable spring connected to the balance lever to permit a de-acceleration moment to the balance lever to be adjusted.

10. The apparatus of claim 7, wherein the airfoil is downwardly disposed so that it produces a down force on the rear of the vehicle.

11. The apparatus of claim 10, further comprising the step of providing a plurality of wing mounts for mounting the airfoil on the vehicle.

12. The apparatus of claim 11, wherein the airfoil has a first, left portion and a second, right portion.

* * * * *